United States Patent [19]

Bailey

[11] 4,386,190
[45] May 31, 1983

[54] POLYMER BLEND OF DIENE/VINYL AROMATIC BLOCK COPOLYMER AND STYRENE/ACRYLATE COPOLYMER

[75] Inventor: Fay W. Bailey, Bartlesville, Okla.

[73] Assignee: Phillips Petroleum Company, Bartlesville, Okla.

[21] Appl. No.: 410,767

[22] Filed: Aug. 23, 1982

[51] Int. Cl.³ ............................................. C08L 53/02
[52] U.S. Cl. ..................................... 525/93; 525/901; 525/96
[58] Field of Search ............................ 525/96, 901, 93

[56] References Cited

U.S. PATENT DOCUMENTS

| | | | |
|---|---|---|---|
| 3,261,887 | 7/1966 | Mann | 260/876 |
| 3,300,545 | 1/1967 | Baer | 260/876 |
| 3,919,157 | 11/1975 | Ide et al. | 260/29.7 T |
| 3,950,292 | 4/1976 | Cooper | 260/23.7 |
| 4,100,228 | 7/1978 | Dennis et al. | 260/880 |
| 4,104,326 | 8/1978 | Fodor | 260/876 B |
| 4,117,035 | 9/1978 | Hillier et al. | 525/901 |
| 4,160,001 | 7/1979 | Rosen | 525/230 |
| 4,195,136 | 3/1980 | Sato et al. | 525/71 |

Primary Examiner—Carman J. Seccuro

[57] ABSTRACT

A high impact resistant polymer is provided comprising a blend of (a) a resinous, essentially non-elastomeric copolymer of a conjugated diene and vinylarene and (b) a copolymer of a vinylarene and an acrylate.

5 Claims, No Drawings

POLYMER BLEND OF DIENE/VINYL AROMATIC BLOCK COPOLYMER AND STYRENE/ACRYLATE COPOLYMER

This invention relates to durable high impact resistant polymer blends. More specifically, this invention relates to blends of (a) resinous, essentially non-elastomeric copolymers of conjugated dienes and vinylarenes and (b) copolymers of vinylarenes and acrylates.

The existence of impact resistant copolymers of conjugated dienes and vinylarenes is known in the art as disclosed in U.S. Pat. No. 4,104,316 and U.S. Pat. No. 4,195,136. In addition, it is known that blends of the abovedescribed copolymers and copolymers of vinylarenes and acrylates result in impact resistant polymers.

These polymer blends have important applications as ingredients in molded articles of manufacture, particularly in food containers. Because the food containers are frequently packaged as part of large bundles and sometimes shipped long distances, they are highly susceptible to damage resulting in loss of the food product. Therefore, polymer blends which exhibit an even higher impact resistance than heretofore exhibited by similar ones are highly desirable because of their durability.

Therefore, an object of this invention is to provide a polymer blend of improved high impact resistance. A further object is to provide an improved high impact resistant polymer blend of (a) copolymers of conjugated dienes and vinylarenes and (b) copolymers of vinylarenes and acrylates.

Other aspects, objects, and advantages of this invention will become apparent from a study of this specification and the appended claims.

In accordance with the present invention, I have discovered a polymeric compositions of improved high impact resistance which comprises a blend of (a) resinous, essentially non-elastomeric copolymers of conjugated dienes and vinylarenes, and (b) copolymers of vinylarenes and acrylates. Preferably, (a) is a block copolymer of conjugated dienes and vinylarenes.

More specifically, in accordance with the present invention, I have discovered an improved high impact resistant polymeric compositions which comprises a blend of (a) a copolymer consisting of from about 64–70 weight percent of a vinylarene and from about 30–36 weight percent of a conjugated diene and (b) a copolymer consisting of a vinylarene and an acrylate, said blend having a total conjugated diene content of from about 21 to about 34 weight percent.

In a preferred embodiment, the blend will have a total conjugated diene content of from 32 to 34 weight percent. It is generally preferred to use conjugated diene-monovinylarene copolymers prepared by employing an alkali-metal-based initiator to copolymerize the monomers in a hydrocarbon diluent. The conjugated dienes generally preferred in the copolymerization are those of 4 to 12 carbon atoms per molecule with those of 4–8 carbon atoms per molecule being more preferred. Examples of these monomers include 1,3-butadiene, isoprene, 2,3-dimethyl-1,3-butadiene, piperylene, 3-butyl-1,3-octadiene and 2-phenyl-1,3-butadiene. The generally preferred vinylarenes contain 8–20, and more preferably 8–12, carbon atoms per molecule. Examples include styrene, alpha-methylstyrene, 1-vinylnaphthalene, 2-vinylnaphthalene and alkyl, cycloalkyl, aryl, alkaryl and aralkyl derivatives thereof. Examples of substituted monomers include 3-methylstyrene, 4-n-propylstyrene, 4-cyclohexylstyrene, 4-dodecylstyrene, 3-ethyl-4-benzylstyrene, 4-p-tolylstyrene and 4-(4-phenyl-n-butyl)styrene.

The vinylarene-acrylate copolymers of my inventive blends can be prepared by copolymerizing at least one vinylarene (as described above) such as styrene, alpha-methylstyrene, o-, m- or p-vinyltoluene, 2,4-dimethylstyrene, 2,4-diethylstyrene, 2-chlorostyrene, 2-chloro-5-methylstyrene, vinylnaphthalene and the like, or mixtures thereof, with at least one substituted or unsubstituted alkyl acyrylate, such as methylacrylate, ethylacrylate, isopropylacrylate, butylacrylate, methyl methacrylate, ethyl methacrylate, butyl methacrylate, hexyl methacrylate, cylohexyl methacrylate, methyl ethacrylate, and the like, or mixtures thereof.

The preferred vinylarene-acrylate copolymer to be used in my inventive blends is a styrene-methyl methacrylate copolymer.

My inventive blends can be prepared by any suitable mixing means, such as dry-blending, melt-blending and solution-blending. The preferred mode of operation is by dry-blending of the components, e.g., in a drum tumbler, for obtaining blends of maximum impact resistance.

In molded objects prepared by any of the well known molding techniques, preferably by injection molding, my inventive blends show a surprisingly high Gardner impact resistance.

The following examples are intended to further illustrate my invention. However, particular materials, ratios and procedures should be considered exemplary and not limitive of the reasonable scope of this invention.

EXAMPLE I

In this example, the preparation of a resinous, polymodal, radially branched butadiene-styrene copolymer is described. This copolymer was prepared in a developmental K-Resin ® pilot plant of Phillips Petroleum Company, and it was used later for preparing my inventive blends.

400 lb. of cyclohexane and 0.05 lb. of tetrahydrofuran were charged to an agitated reactor. Then 0.06 lb. of n-butyllithium initiator was added, followed by the first styrene charge of 59 lb. The temperature was raised from about 50° C. to about 80° C. during a time period of about 4 minutes after the styrene charge. The second styrene portion of 33 lb. was added after briefly cooling the reactor about 20° C. below the previous peak temperature and reheating to about 80° C., which occurred about 21 minutes after the first styrene charge. The third portion of styrene (40 lb.) and the second n-butyllithium charge (0.32 lb) followed after a brief cooling down period. A third peak temperature of about 87° C. was reached 32 minutes after the first styrene charge. The reactor pressure during these three reaction stages was about 21-24 psig. Finally, about 50 minutes after the start of the polymerization reaction, 68 lb. of butadiene were added. The temperature was raised to about 100° C., and the pressure was raised to about 45 psig, during a period of about 5 minutes. Then 1.0 lb. of Admex 711, an epoxidized soybean oil coupling agent marketed by Sherex Chemical Company, was added.

The copolymer solution was transferred to a blowdown vessel to which 0.8 lb. of water plus 0.8 lb. of $CO_2$ were charged as terminating agents. Then 1.9 lb of BHT (2,6-di-t-butyl-p-cresol) and 1.3 lb of TNPP (trisnonyltriphenyl phosphite) were added as antioxidants, and 0.5 lb of a microcrystalline paraffin wax was added as an antiblocking agent. Finally, the copolymer was recovered by solvent removal in a film evaporator and a devolatilizing extruder. The polymer melt flow at 200° C. of the prepared resinous, polymodal, branched copolymer having a weight ratio of butadiene:styrene of 34:66 was 7.0 g/10 minutes at 200° C. (ASTM D1238, Condition G). Another copolymer having a 32:68 butadiene:styrene weight ratio and having a melt flow of 6.8 g/10 minutes was prepared by essentially the same polymerization procedure as described earlier in this example.

EXAMPLE II

Pellets of the resinous, polymodal butadiene-styrene copolymers of Example I having a bound styrene content of 66-68 weight percent were dry-blended by tumbling in a plastic bag with various amounts of pelletized Noan 80, a styrene-methyl methacrylate copolymer having a bound styrene content of 80 weight percent, a melt flow of about 2.0 g/10 min. (ASTM D1238 Condition G), a specific gravity of 1.08, and a deflection temperature (annealed, ASTM D648) of 99° C., marketed by Richardson Company, Madison, Conn., under the tradename of Noan 80. The dry-blending was done manually for about 60 seconds.

Prepared blends were molded in an Arburg 221 E/150 1½ ounce molding machine at a barrel temperature of about 200° C., a mold temperature of 50° C., a screw speed of 120 r.p.m., and an injection pressure of about 63-75 MPa. Total cycle time was about 35 minutes. Molded disks of an average thickness of 57 units (1.45 mm) made of various inventive and control blends containing resinous butadiene-styrene copolymer and styrene-methyl methacrylate copolymer were tested in a Gardner IG-1120 heavy-duty impact tester according to a modified ASTM D2444-70 procedure described in the IG-1120 manual of Gardner Laboratories, Bethesda, Md. All tests were carried out with a 4-lb weight and a 40 inch guide tube slot at room temperature for determining impact energy which divided by the specimen thickness in millimeters to give impact values in units of an Kg/mm². Impact data are listed in Table I.

TABLE I

| Run | Weight-% of K-Resin ®[1] | Weight-% of Noan 80[2] | Weight-% Butadiene in Blend[3] | Gardner Impact[4] (cm · kg/mm) |
|---|---|---|---|---|
| 1 (Control) | 100 | 0 | 34.0 | 56 |
| 2 (Control) | 100 | 0 | 32.0 | 61 |
| 3 (Invention) | 93.7 | 6.3 | 30.0 | 66 |
| 4 (Invention) | 85.9 | 14.1 | 27.5 | 69 |
| 5 (Invention) | 85.0 | 15.0 | 28.9 | 58[5] |
| 6 (Invention) | 78.1 | 21.9 | 25.0 | 77 |
| 7 (Invention) | 75.0 | 25.0 | 25.5 | 66 |
| 8 (Invention) | 70.3 | 29.7 | 22.5 | 74 |
| 9 (Control) | 62.5 | 37.5 | 20.0 | 62 |
| 10 (Control) | 55.0 | 45.0 | 18.7 | 43 |
| 11 (Control) | 50.0 | 50.0 | 17.0 | 57 |
| 12 (Control) | 45.0 | 55.0 | 15.3 | 43 |
| 13 (Control) | 39.1 | 60.9 | 12.5 | 0.5 |
| 14 (Control) | 35.0 | 65.0 | 11.9 | 58[5] |
| 15 (Control) | 25.0 | 75.0 | 8.5 | less than 1 |
| 16 (Control) | 0 | 100 | 0 | less than 1 |

[1] an experimental resinous, polymodal, radial butadiene-styrene copolymer having bound butadiene content of 32-34 weight percent and a bound styrene content of 68-66 weight percent.
[2] a styrene-methyl methacrylate copolymer having a bound styrene content of 80 weight percent marketed by Richardson Company;
[3] $\frac{\text{weight-\% K-Resin\textregistered\ in blend}}{100} \times$ weight-% bound butadiene in K-Resin®
[4] determined according to the modified ASTM D2444-70 procedure described in Gardner Laboratories IG-1120 manual, using a 4 lb weight;
[5] most likely erroneous results.

Data in Table I show that quite surprisingly the addition of up to about 30 weight-% of a low-impact resin (Noan 80) to a high-impact butadiene-styrene resin (K-Resin ®) having a bound butadiene content of about 32-34 weight-% and a bound styrene content of 66-88 weight-% improves the impact resistance of the latter at least 10%. Another, more general interpretation of the data of Table I shows that an improvement in Gardner impact of K-Resin ® resin by the addition of styrene-methyl methacrylate copolymer (Noan 80) is attained at levels of about 22.5 to 34.0 weight percent of copolymerized butadiene based on the weight of the entire blend.

EXAMPLE III

This example describes control blends comprising a commercial resinous, polymodal, radial butadiene-styrene copolymer, KR03 K-Resin ® having a bound styrene content of 76 percent by weight, and a styrene-methyl methacrylate copolymer, Noan 80 having a bound styrene content of 80 percent by weight. The K-Resin ® is commercially available from Phillips Petroleum Company and was prepared in accordance with the procedure described in Example I, except that the three incremental styrene additions were 68 lb., 38 lb., and 46 lb., respectively, and the amount of butadiene was 48 lb. Blending and molding conditions were essentially the same as those described in Example II.

Gardner impact data of the prepared blends listed in Table II, do not show the substantial improvement of at least 10 percent demonstrated by the blends of Example II. The slightly higher impact data of Runs 18 and 19 versus Run 17 are well within the experimental error of the test method.

TABLE II

| Run | Weight-% of K-Resin ®[1] | Weight-% of Noan 80[2] | Weight-% Butadiene in Blend[3] | Gardner Impact (cm · kg/mm)[4] |
|---|---|---|---|---|
| 17 (Control) | 100 | 0 | 24.0 | 59 |
| 18 (Control) | 90 | 10 | 21.6 | 62 |
| 19 (Control) | 80 | 20 | 19.2 | 63 |
| 18 | | | | |

TABLE II-continued

| Run | Weight-% of K-Resin®[1] | Weight-% of Noan 80[2] | Weight-% of Butadiene in Blend[3] | Gardner Impact (cm · kg/mm)[4] |
|---|---|---|---|---|
| (Control) | 70 | 30 | 16.8 | 45 |

[1] a resinous, polymodal, radial butadiene-styrene copolymer having a bound butadiene content of 24 weight percent, commercially produced and marketed by Phillips Petroleum Company, Bartlesville, OK.
[2] a styrene-methyl methacrylate copolymer having a bound styrene content of 80 weight percent.
[3] $\frac{\text{weight-\% K-Resin® in blend}}{100} \times$ weight-% bound butadiene in K-Resin®
[4] determined according to the modified ASTM D2444-70, procedure described in IG-1120 manual of Gardner Laboratories, using a 4 lb weight.

Reasonable variations and modifications are possible from the present invention without departing from the spirit thereof.

I claim:

1. A high impact resistant composition comprising a blend consisting of (a) a resinous, essentially non-elastomeric block copolymer of from 30–36 weight percent of a conjugated diene and from 64–70 weight percent of a vinylarene and (b) a copolymer consisting of a vinylarene and an acrylate, said blend having from about 21–34 total weight percent of said conjugated diene.

2. A high impact resistant composition according to claim 1 wherein said conjugated diene has from 4–12 carbon atoms per molecule and said vinylarene has from 8–20 carbon atoms per molecule.

3. A composition according to claim 1 wherein said resinous copolymer in (a) consists of from about 32–34 weight percent of said conjugated diene.

4. A composition according to claim 1 wherein (a) is a butadiene-styrene copolymer.

5. A composition according to claim 1 wherein (b) is a styrene-methyl methacrylate copolymer.

* * * * *